Nov. 4, 1941.  E. S. SMITH, JR  2,261,300

TELEMETRIC CONTROLLER

Filed Dec. 18, 1937  2 Sheets—Sheet 1

Ed S. Smith, Jr.
INVENTOR

BY
Maxwell Barus
ATTORNEY

Ed S. Smith, Jr.
INVENTOR

BY Maxwell Barus
ATTORNEY

Patented Nov. 4, 1941

2,261,300

UNITED STATES PATENT OFFICE 2,261,300

TELEMETRIC CONTROLLER

Ed S. Smith, Jr., St. Albans, N. Y., assignor to Builders Iron Foundry, Providence, R. I., a corporation of Rhode Island Application December 18, 1937, Serial No. 180,486

5 Claims. (Cl. 172—239)

This invention relates to methods of and apparatus for telemetrically controlling a variable quantity.

A feature of the invention resides in the transmission of signals corresponding with the values of a physical condition, such, for example, as the differential pressure produced by a flow of liquid in a conduit, and controlling a motor in accordance with the departure from equality of the oscillations of a member controlled by said signals.

The invention also provides for the cyclical transmission of complemental "on-off" impulses in correspondence with the actual value of a variable and the control of a motor in accordance with the departure of said "on-off" signals from equality.

The invention additionally comprises the provision of pilot means, practically independent of inertia, which is capable of reversing its direction of motion in immediate response to the appropriate telemetric signals. Combined with said pilot means is a more powerful regulating means which is brought into action only when necessary to effect the desired regulation.

A further object of the invention resides in the provision of a control system wherein the pilot means, while capable of sensitive and prompt response to very small variations from the set value of a variable, will not cause fluctuation or hunting. The pilot means at the same time is capable of acting as an integrator, bringing the control-effecting means into action promptly upon the accumulation of a predetermined variation from the set value.

All of the foregoing objects moreover are attained with only two wires, or with one wire and ground, between the quantity-responsive signal transmitting means and the pilot means.

Other objects and advantages of the invention will be hereinafter described and claimed.

Figure 1:
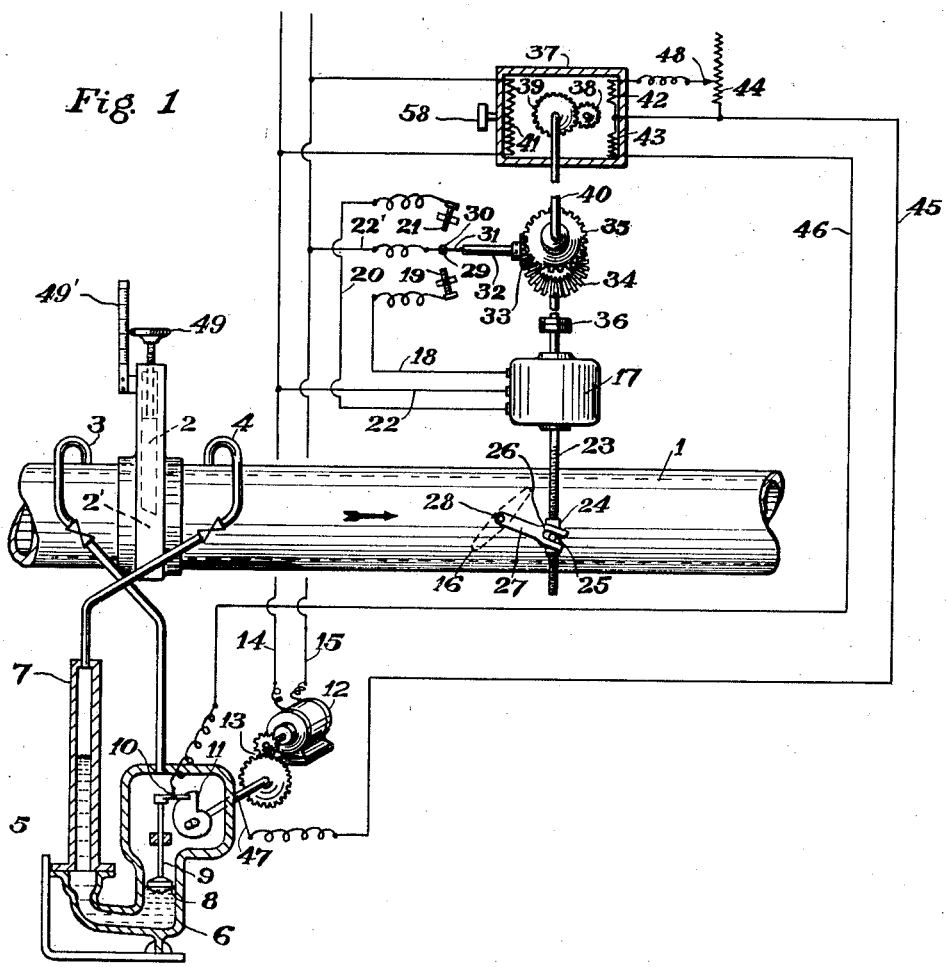
Fig. 1 is a diagrammatic view, with certain parts in elevation and others in vertical section, illustrating an embodiment of my invention.

Referring to Fig. 1 of the drawings, the invention is shown applied to the maintaining of a given rate of flow of liquid through a conduit 1. Interposed in the conduit is an orifice plate 2, manually adjustable vertically to vary the area of the orifice 2' through which the liquid flows. Taps 3 and 4 from conduit 1 are connected to a conventional U-tube 5 containing a manometric liquid such as mercury, the high pressure tap 3 being connected to leg 6 of said U-tube, and the low pressure tap 4 to leg 7. A float 8 rests upon the surface of the manometric liquid and is thus positioned in accordance with the differential pressure between taps 3 and 4, or, in other words, in correspondence with the square of the velocity of the liquid flowing in the conduit 1.

The stem 9 of float 8 carries a contactor 10 which engages a square root cam 11, rotated at constant speed by synchronous motor 12, through suitable gearing 13. Motor 12 is energized from alternating current supply lines 14, 15. Due to the shape of cam 11, the period of engagement between said cam and the contactor 10 in each cycle of rotation of said cam is proportional to the square root of the differential pressure between points 3 and 4 and is thus proportional to the velocity of the liquid flowing in the conduit 1.

Positioned in conduit 1 downstream with respect to tap 4 is a valve 16 for regulating the velocity of flow of the liquid in said conduit. This valve is operable in either direction by a reversible motor 17 of any suitable type. Said motor may, for example, include a pair of field windings for causing operation of its armature in opposite directions, respectively; one of said windings being connected by a wire 18 with a contact 19, and the other of said windings being connected by a wire 20 with a contact 21, both windings being furthermore connected by a common return wire 22 with main supply wire 14. Motor shaft 23 may be screw threaded as shown and engage a nut 24, connected by pin 25 and slot 26 with an arm 27 extending from and secured to the pivot shaft 28 of the valve 16. The latter is here illustrated as of the butterfly type.

Movable in the gap between contacts 19 and 21 are contacts 29 and 30, carried by a resilient blade 31, adapted to engage the respective contacts 19 and 21 upon movement of the blade 31 through a sufficient extent in the proper direction. Said blade 31 is mounted on an arm 32, which has journaled thereon a pinion 33 meshing with a pair of differential gears 34, 35. Said arm 31 acts as the conventional spider element of the differential gear system 33, 34, 35, and turns about the axis of said gears 34 and 35 whenever said gears move unequally.

A wire 22' connects contacts 29 and 30 to main line wire 15.

Gear 34 is connected, through a conventional friction coupling 36, with the shaft of motor 17, while gear 35 is driven by a pilot motor 37, through pinion 38 on the shaft of said motor, gear 39, and shaft 40. In the embodiment shown in Fig. 1 it will be understood that the shaft 40 and the shaft of the motor 17 are in line with each other and that the axes of rotation of gears 34 and 35 are the axes of rotation of said shafts, though said gears are illustrated at an angle to said shafts to show the differential mechanism more clearly.

Motor 37 is of a well known type comprising a field coil 41, which is continuously connected to the alternating current supply lines 14, 15, and further comprising a pair of shading coils 42, 43. A circuit through coil 42 is continuously closed through a resistance 44 in series with said coil as shown. Coil 43 is connected through wires 45 and 46 with contactor 10 and cam 11 respectively, so that a low resistance circuit through said coil 43 is closed whenever said contactor is engaged with said cam and is broken whenever said contactor and cam are out of engagement. Wire 45 may be conveniently connected with cam 11 through a brush 47 engaging the shaft of said cam as shown. As long as the circuit through coil 43 is open the pilot motor 37 will run steadily in one direction, and as long as said circuit is closed said motor will run steadily in the opposite direction. While in the present example of the invention the resistance in series with coil 42 is so chosen that the forward and reverse speeds are equal, it will be understood that, if desired, said resistance may be varied, through the manually adjustable contactor 48, to vary the ratio between the forward and reverse speeds to the extent desired.

The operation of the embodiment illustrated in Fig. 1 is as follows:

The orifice 2' creates a differential pressure between the points 3 and 4 which varies as the square of the velocity of the liquid flowing in the conduit 1. So long as this differential pressure is at such value that the circuit through coil 43 is closed by the engagement of contactor 10 and cam 11 in each cycle for a period equal to the period in the cycle in which the cam 11 and contactor 10 are disengaged, the pilot motor 37 operates the arm 32 through equal extents in opposite directions in each cycle. In other words, as long as the value of the differential pressure is such that the respective periods of energization and de-energization of coil 43 in each cycle are equal, arm 32 simply oscillates through equal extents, and without engaging either contact 29 or 30 with its associated contact 19 or 21. Motor 17 remains out of action as long as this condition continues.

If the differential pressure is, for any reason, such as increased flow, greater than that above referred to, the coil 43 is energized for a longer period than is coil 42, and consequently the arm 32 is operated through a greater extent in one direction than the other, said arm moving further toward that one of the contacts 19, 21, which when engaged by the corresponding contact on arm 32, will cause motor 17 to operate valve 16 in the direction for decreasing the flow in conduit 1, thereby re-establishing the desired differential pressure. As soon as motor 17 commences operating, gear 34 is turned thereby in such direction as to move arm 32 to disengage said contacts, and upon such disengagement the motor 17 is de-energized. Said contacts are disengaged by rotation of gear 34 when motor 37 ceases rotating gear 35 in the direction for engaging said contacts. The foregoing action may be sufficient to bring valve 16 into the proper position for obtaining the appropriate differential pressure, but, if it is not, said action is repeated in one or more successive cycles, the pilot motor 37 effecting engagement of the contacts aforesaid and the valve motor 17 disengaging said contacts, until valve 16 assumes the proper position. Similarly, if the differential pressure is at a value lower than that requisite for the energization of coils 42 and 43 for equal periods, arm 32 is turned further in the direction for bringing the proper contacts into engagement for causing motor 17 to operate valve 16 in the opening direction, and said motor actuates said valve in said direction until said contacts are disengaged, this action being repeated in each cycle, if necessary, until valve 16 is positioned to produce the appropriate higher differential pressure.

With valve 16 set in the position corresponding to the differential pressure aforesaid, any variation of said differential pressure will result in operation of arm 32 through a greater extent in one direction than in the other, bringing one of its contacts further toward the appropriate contact 19 or 21, for causing motor 17 to turn valve 16 in the proper direction to restore said differential pressure to the set value. By suitably spacing the contacts 19, 21 from the corresponding contacts 29, 30 on the arm 32, the latter may be permitted to move a finite distance in either direction, within the space between said contacts 19, 21, without causing operation of the valve motor 17, but upon accumulation of sufficient variations in one direction or the other said motor 17 operates to shift valve 16 in the direction for restoring said differential pressure to within the range of permissible departure. The motor 37 and associated contact mechanism thus function as a form of integrator.

The velocity of flow of the liquid in conduit 1, as above noted, is a function of the differential pressure between points 3 and 4, said velocity varying as the square root of said differential pressure. The quantity rate of flow of said liquid equals the product of its velocity times the area of the orifice 2'. It will hence be apparent that the mechanism above described enables a desired quantity rate of flow (hereinafter referred to simply as rate of flow) to be accurately maintained for a given setting of the orifice plate 2. Whenever a change in said rate of flow is desired, the operator simply raises or lowers the orifice plate 2 by turning the knob 49. A scale 49' may be associated with said knob as shown. Upon thus changing the position of the orifice plate 2 the differential pressure between points 3 and 4 is changed for only a short interval, and is restored to its former value by the operation of the valve motor 17 under control of the pilot motor 37 in the manner above described.

It will thus be seen that through the apparatus above described, departures from a given differential pressure are automatically rectified with promptness and precision and a given differential pressure effectively maintained. To vary the flow rate it is merely necessary for the operator to change the setting of the orifice plate 2; the pilot motor 37 controlling the valve motor 17 to maintain the differential pressure at a given value despite adjustments of said plate so that the flow rate varies in proportion to the position of said plate. And as long as the plate 2 is set in a given position, the apparatus above described speedily corrects any departures of the differential pressure from such value as maintains the contacts 29, 30 out of engagement with contacts 19, 21, and rapidly and accurately restores said differential pressure to said value. Thereby the rate of flow, which as above noted is commensurate with the differential pressure, is effectively maintained at a given value. So long as the differential pressure remains at the desired value, within the limits, as determined by the spacing of the contacts 19, 21, the valve 16 remains at rest, with contacts 29 and 30 oscillating within said space, but when the integrated departures from said value exceed said limits, the contact carrying arm 32 establishes the necessary circuit to bring the valve motor 17 promptly into action to restore the differential pressure within said limits. The latter may be narrowed as desired by appropriate adjustment of said contacts 19 and 21.

An important feature of the invention resides in the fact that it provides uniform response to changes in the differential pressure. In other words, the length of time required to effect a given correction is constant. Since the apparatus maintains a uniform differential pressure, regardless of the setting of the orifice plate, its speed of response to a change in said differential pressure is uniform. It may further be noted that in the apparatus above described, the value of the differential pressure necessary to provide an on-signal of a duration equal to the off-portion of the cycle is well above the values in the neighborhood of zero; so that the time of response to differential pressure changes is not only constant but is considerably shorter than for changes in differential pressure at values in the lower range. In short, by maintaining a uniform differential pressure at values substantially above the lower range, a marked uniformity and sensitivity of response of the transmitter comprising the contactor 10 and cam 11, and hence of the means for operating the valve 16, is obtained. Since, as above noted, the duration of engagement between contactor 10 and cam 11 varies as the square root of the differential pressure, the changes in said duration corresponding to changes in said differential pressure, at the value thereof requisite for maintaining coil 43 energized for 50% of each cycle, are substantially uniform. It may be further observed that the variation of flow rate with a given change of differential pressure at these values is less than for the same change in differential pressure at lower values, so that by operating the control apparatus at the higher values of the differential pressure the maintenance of uniform flow rate is facilitated.

Through the provision of the adjustable orifice plate 2, the sensitivity and iso-responsiveness of the transmitter may be extended over a wide range of flow rates. If, for example, it is desired to obtain a lower flow rate than that for which the plate 2 is set, the setting of said plate is changed to decrease the orifice. The differential pressure is maintained at its previous value, however, by the control of the transmitter signals over the valve 16. Thus, a control over a broad range of variations in rates of flow is attainable with a given and effective differential pressure value, and hence with constant sensitivity and responsiveness of the apparatus.

It may also be noted that the type of motor 37 illustrated is practically independent of inertia and is capable of instant response to the engagement and disengagement of cam 11 and contactor 10. Tests have shown that such motor will reverse and come up to speed within a single alternating current cycle, i. e., 1/60 of a second with alternating current of 60 cycle frequency. At the same time it will be understood that other forms of low inertia and high responsiveness can be utilized, such, for example, as the reversible motor shown at 60 in Fig. 3, and more particularly referred to hereinafter. It will also be evident that any suitable conventional type of motor may be employed for the valve motor 17. Magnetic braking means well known in the art for preventing over travel of the motor may also be employed in connection with said motor 17.

The speed of the valve motor 17, and/or of pilot motor 37, may be varied in any well-known manner so as to give maximum speed of valve 16 without hunting under a variety of conditions. A conventional speed adjusting element is illustrated for this purpose at 58 in connection with the motor 37.

It will be further observed that, while the pilot motor may be of low inertia, instantly and precisely responsive even to minute variations in the signals received from the transmitter, the valve motor 17 may be considerably more powerful, to insure effective operation of the valve. The valve motor at the same time is under the precise control of the pilot motor and moves only when necessary to effect the desired regulation.

With a negligible gap between contacts 19 and 21, the apparatus above described controls the average flow rate exactly to that set over a period of time. With a finite gap, the maximum possible departure of total quantity is the same regardless of length of operation. Owing to the resiliency of the blade 31, a slight operation of motor 37 is permitted after engagement of either pair of contacts. If desired, a friction drive coupling similar to coupling 36, may be interposed between gear 35 and the pilot motor, enabling slippage to occur whenever motor 37 is rotating and arm 32 is in either extreme position of its movement with blade 31 flexed.

It may be further observed that, with the connections illustrated between the valve 16 and differential gear 34, the latter, and hence the contact arm 32, will be driven at a higher rate of speed from motor 17 than is valve 16, and also at a higher speed than gear 35 is driven by pilot motor 37. This permits minute adjustments of the valve 16. Said connections may, of course, be varied as desired.

It may also be noted that with the apparatus above described any change in the duration of the signal resulting from engagement of contactor 10 with cam 11 effects an increased change in the oscillation of the contact carrying arm 2. For example, with the signal duration 50% of the cycle, a 1% decrease in said duration changes the "on" period to 49% and the "off" period to 51%, giving a net change of 2% in the effect upon the oscillating contact carrying arm 32. The sensitivity of the apparatus is thus doubled.

The provision for effecting control through complemental cyclical "on-off" impulses further enables the provision of only two wires (or one wire and ground) between the transmitter and the control effecting means.

Figure 2:
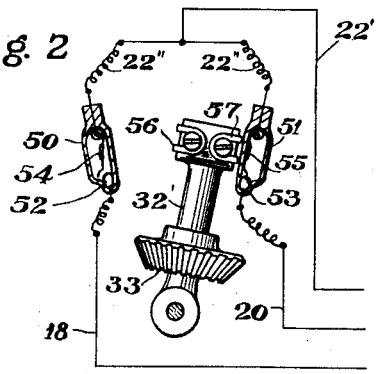
Fig. 2 is a view in side elevation, partly in section, of an alternative form of a contact mechanism for controlling a motor for governing the dependent quantity.

In Fig. 2 I have illustrated a pair of magnetically operated enclosed mercury switches 50, 51 of known type, for energizing the respective field coils of the valve motor 17 under control of arm 32' of the differential gearing. Each switch 50, 51 has a globule 52, 53, respectively, of mercury or other suitable conducting liquid, connected to wires 18, 20, from the coils of valve motor 17. The common return wire 22' is connected through branches 22'' to movable magnetic elements 54, 55, in the respective switches. Differential gear arm 32' on which is journaled pinion 33' for meshing with gears 34, 35, is the same as arm 32 of Fig. 1 except that said arm 32' is shown rigid throughout its length and has affixed thereto a pair of permanent magnets 56, 57. Approach of either magnet to within a predetermined distance of the corresponding switch 50 or 51 draws the magnetic element 54 or 55 of said switch into contact with the mercury globule 52 or 53, thereby energizing the corresponding coil of the valve motor 17. In Fig. 2, the element 55 of switch 51 is shown drawn into contact with globule 53 by magnet 57. While the magnet-carrying portion of arm 32' might be made resilient, the magnetic field of said magnets enables said arm to move slightly beyond the position in which it causes operation of either of the enclosed mercury switches.

Figure 3:
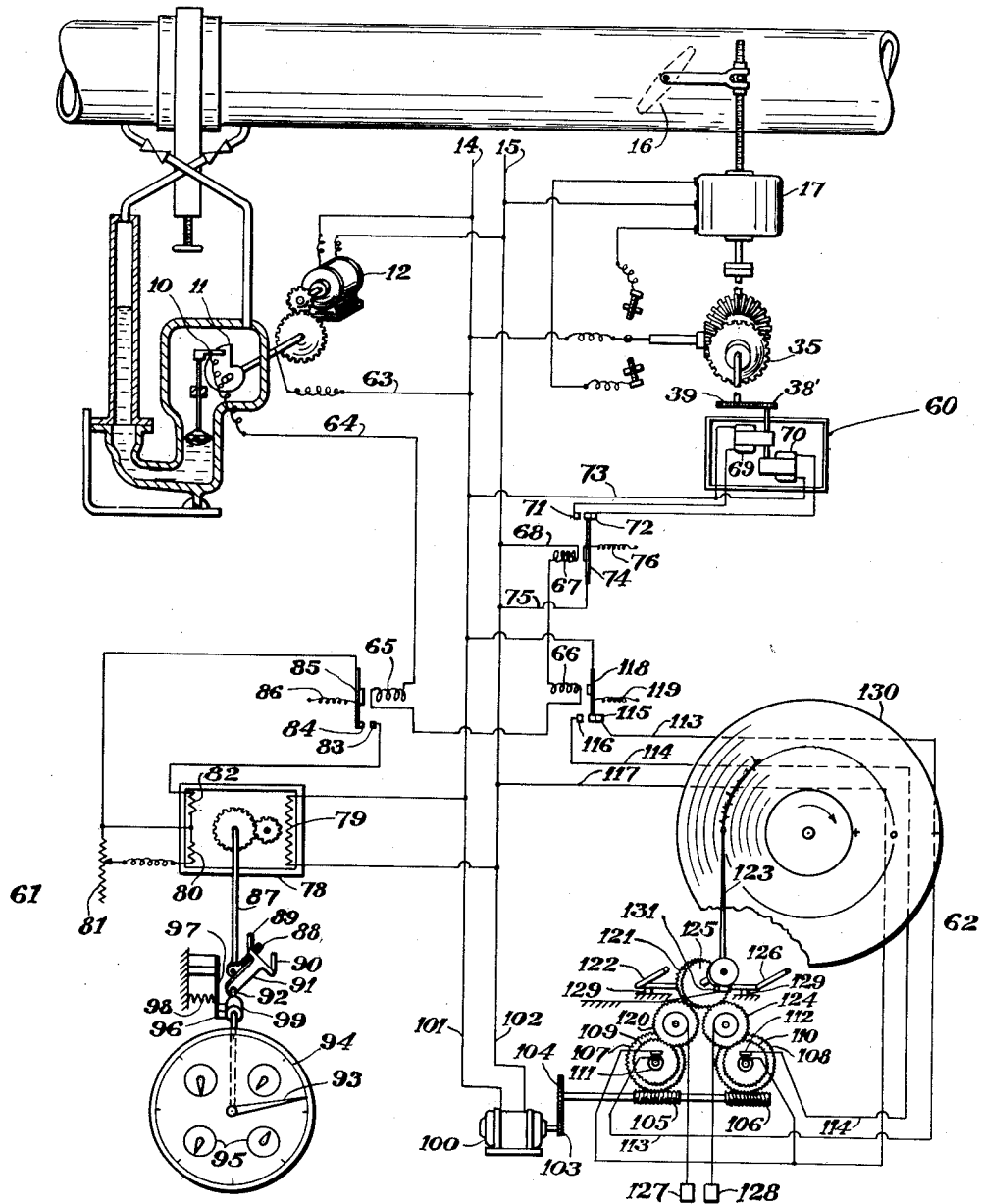
Fig. 3 is a diagrammatic view, with certain parts in elevation, illustrating an indicator and a recorder controlled by the transmitter of Fig. 1.

In Fig. 3 the signals from the transmitter contactor 10 and cam 11 control not only a reversible pilot motor 60, but also an indicator 61 and a recorder 62. As long as contactor 10 and cam 11 are in engagement in each cycle, an impulse is sent from main 14 through wire 63, through said contactor and cam, and thence through wire 64, relay coils 65, 66, and 67, and wire 68 to main 15.

The reversible synchronous motor 60 is of a type well known in the art and comprises a pair of coils 69, 70; one of which, when energized, effects rotation of the motor in one direction, and the other of which, when energized, effects rotation of the motor in the opposite direction. Said coils are connected, respectively, to contacts 71, 72, and by a common return wire 73 to main 14. A contact blade 74 is connected to main 15 by wire 75 and maintained in engagement with contact 72 by spring 76 whenever coil 67 is deenergized, at which time a circuit is closed through coil 70 and the motor 60 runs in one direction. As soon, however, as coil 67 is energized, the circuit through motor coil 70 is broken and a circuit through motor coil 69 is established, whereupon said motor operates in the reverse direction. Motor 60 controls the valve motor 17 in the same way as does motor 37 of Figure 1, a pinion 38' being shown on the shaft of said motor 60 for meshing with gear 39 to drive gear 35 of the differential gear contact mechanism of Fig. 1. As in the case of motor 37, motor 60 operates in one direction for one-half of a cycle and in the opposite direction for the remaining half as long as the differential pressure is at the corresponding value, during which time the motor 17 is out of action; but upon the occurrence of an appreciable (or persistent) inequality of the "off" and "on" periods motor 17 is brought into action and operates valve 16 in the direction to restore equality between said "off" and "on" periods.

The indicator apparatus 61, located at a receiving station remote from the transmitter, is illustrated as comprising a reversible motor 78 of the same type as motor 37. Coil 79 of said motor is connected across the mains 14, 15, while a circuit through coil 80 is continuously closed through the adjustable resistance 81. Coil 82 is connected to a pair of contacts 83, 84. Contact 84 is carried by a blade 85 which is biased by spring 86 to separate said contact from contact 83. These contacts are separated, and coil 82 open-circuited, as long as contactor 10 is out of engagement with cam 11, but when said contactor engages with said cam, coil 65 is energized as noted above, and thereupon attracts blade 85 which moves contact 84 into engagement with contact 83. On deenergization of coil 65, spring 86 retracts blade 85 and permits contact 84 to separate from contact 83. Thus it will be seen that motor 78 operates concurrently with motor 60 and oscillates the shaft 87 in each cycle through extents commensurate with the "on" and "off" signal periods. An arm 88 on said shaft oscillates with the latter within the space provided by the extensions 89, 90 of an arm 91 secured to shaft 92 which carries a pointer 93, cooperating with a scale 94. So long as the "on" and "off" signal periods are equal, the arm 88 oscillates without actuating the arm 91 and shaft 92, but upon an appreciable departure from equality of said periods said arm 88 operates said arm and shaft and thereby moves pointer 93 through an extent commensurate with the difference between said "on" and "off" periods. Pointer 93 thus stands still as long as the rate of flow remains at the value determined by the setting of the orifice plate, but said pointer is shifted in one direction or the other as soon as the actual rate departs from that set. Said pointer further indicates on the scale 94 the algebraic sum of the departures from the set rate and thus acts also as an integrator. The shaft 92 may also operate a conventional counter mechanism 95 to integrate said departures and exhibit the total thereof.

A brake shoe 96 carried by an arm 97 is constantly maintained by a spring 98 in engagement with a disk 99 on shaft 92, to insure retaining said shaft, and the pointer 93, in their set positions.

The recorder apparatus 62 includes a synchronous motor 100 connected by wires 101, 102 to the mains 14, 15, and rotating in unison with the transmitter motor 12. Said motor, through gearing 103, 104, continuously drives a shaft which has secured thereto two worm gears 105, 106, the threads of one of which run in the reverse direction from those of the other. Said worms mesh with worm wheels 107, 108, respectively, so that the latter are rotated continuously in opposite directions. A pair of electro-magnetic clutches (not shown, but which may be similar to those indicated at K₁ and K₂ in Wilde Patent No. 1,985,130) rotate with said worm wheels and are adapted when energized to clutch the respective gears 109, 110 to the rotating shafts of said worm wheels. Slip rings 111 and brushes 112 convey current to said electromagnetic clutches.

Wires 113, 114 run from brushes of the respective clutches to contacts 115, 116, respectively. A return wire 117 is connected to the remaining brushes of said clutches and to wire 15, as shown. Connected to wire 14 is a contact blade 118 which is maintained in engagement with contact 115, by spring 119, as long as contactor 10 at the transmitter is disengaged from cam 11. At such times, the clutch which rotates with worm wheel 107 is energized, and gear 109 rotates with said worm wheel. When contactor 10 engages cam 11, coil 66 is energized and attracts the blade 118 into engagement with contact 116. The clutch between gear 109 and worm wheel 107 is now de-energized, and the clutch between worm wheel 108 and gear 110 is energized. It will thus be apparent that the gears 109 and 110 rotate in each cycle through extents commensurate with the respective "on" and "off" signal periods.

Gear 109 meshes with a gear 120 which in turn drives a gear 121, on the shaft of which is an arm 122 having a portion bent laterally, as shown, to cooperate with a pointer 123 journaled for rotation about the axis of gear 121. Similarly, gear 110 meshes with a gear 124 which engages a gear 125 on the shaft of which, coaxial with that of gear 121, is an arm 126 having a portion bent laterally to cooperate with said pointer. Weights 127, 128 attached to cords running over the hubs of the respective gears 120, 124, restore the latter, together with the respective arms 122, 126, to a normal position when the respective clutches are de-energized. In its initial or return position, each of said arms rests upon a suitable stop 129.

From the foregoing description, it will be seen that as soon as contactor 10 engages cam 11, the gear 110 is clutched to worm wheel 108 and the arm 126 is thereby rotated counter-clockwise (Fig. 3) from its initial position, said arm continuing to rotate counter-clockwise until said contactor 10 becomes disengaged from said cam. Thereupon, gear 110 is unclutched from worm wheel 108, and weight 128 restores arm 126 to its initial position. As soon, however, as contactor 10 and cam 11 become disengaged, the clutch between gear 109 and worm wheel 107 is energized, with consequent rotation of arm 122 clockwise from its initial position, and such clockwise rotation of arm 122 continues until said contactor and cam again come into engagement. Thus the respective arms 122, 126 rotate in each cycle in opposite directions through complemental extents, proportional to the "on" and "off" signal periods.

So long as said "on" periods equal the "off" periods, the arms 122 and 126 move through equal extents and do not affect the setting of pointer 123, which then remains undisturbed in the position shown, i. e., at the zero position with respect to chart 130. However, upon departure of the flow rate from the set value, the resulting inequality of the "on" and "off" periods aforesaid causes unequal movements of the arms 122 and 126 with consequent shifting of pointer 123 through an extent commensurate with said departure and in the direction corresponding thereto. A friction shoe 131 holds pointer 123 in its then position until moved by either arm 122 or 126. Said pointer thus indicates the then departure from the set rate. The chart 130 is continuously rotated by clock-work or other suitable constant speed means, and the pointer 123 is provided with a suitable stylus for recording its position on said chart. The amount and direction of departure from the set rate are thus continuously recorded.

It will be understood that the terms "oscillating" or "oscillations" as employed herein are not restricted to pivotal or rotary reverse movement but are intended to include rectilinear reverse movement. It will be evident, for example, that the contact carrying arm 32 of Fig. 1, instead of rotating reversely with the spider element of the differential gearing might constitute a rack member geared to the spider element so as to be reciprocated rectilinearly thereby within the limits defined by the contacts 19 and 21.

It will also be apparent, for example, that the resistance 44 or 81 of motor 37 or 78, may be either ohmic or reactive, and the employment of the term "resistance" is intended to include any other well-known form of impedance.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. In a telemetric controller, means for cyclically transmitting signals of a function of time corresponding with values of a variable, a motor, a second motor having a pair of shading coils one of which is continuously close-circuited through a resistance and the other of which is connected to said transmitting means through a lower resistance for causing said second motor to operate in reverse directions in each of a plurality of successive cycles under control of said signals and said close-circuited shading coil, contact means for controlling energization of the first motor, means actuated by the second motor for operating said contact means, said operating means including an element movable to effect closing of said contact means and adapted to continue its movement within limits beyond the point at which it effects closing of said contact means, means operated by the first motor for shifting said element to a position wherein said contact means is opened, and means providing slippage between the first motor and said element when said element reaches either of said limits.

2. In a telemetric controller, motor means, means for cyclically transmitting impulses of a function of time corresponding with values of a variable, contact means for controlling energization of said motor means, oscillating means responsive to said impulses for operating a portion of said contact means in a positive direction during said impulses and in a negative direction during cessation of said impulses and for closing said contact means upon a predetermined algebraic accumulation of the differences in amplitude of said positive and negative oscillations of said contact means portion from a given reference point, said oscillating means comprising an element movable to effect closing of said contact means and adapted to continue its movement within limits beyond the point at which it effects closing of said contact means, and yielding means enabling said oscillating means to operate without actuating said element when said element reaches either of said limits.

3. In a telemetric control method, the steps comprising producing in each of a series of uniform time periods two different electrical circuit conditions, the duration of one condition being commensurate with the actual value of a variable and the duration of the other condition being the complement of the one, oscillating an element in each of said time periods through an extent in a positive direction corresponding to the duration of one of said conditions and in a negative direction through an extent corresponding to the remaining portion of said period, and energizing a power means whenever the algebraic summation of the differences in amplitude of said positive and negative oscillations of said oscillating element exceeds a predetermined amount beyond a given reference point.

4. In a telemetric controller, means for transmitting in uniform time periods a signal of a duration corresponding with the value of a variable, pilot means operable in a positive direction in each period while said signal is on and in a negative direction during the remainder of each period, motor means, and motor controlling means operable in reverse directions by said pilot means for energizing said motor means upon a given algebraic accumulation of the differences in amplitude of said positive and negative oscillations of said motor controlling means in either direction beyond a given reference point.

5. In a telemetric controller, motor means, means for cyclically transmitting impulses of a function of time corresponding with values of a variable, contact means for controlling energization of said motor means in one direction or the other, said contact means including spaced contacts and a member movable with respect to said contacts, oscillating means responsive to said impulses for operating said member in one direction during said impulses and in the opposite direction during cessation of said impulses in each cycle and effecting engagement of said member with one or the other of said contacts as a result of an algebraic accumulation of the differences in the movements of said member in opposite directions during each cycle.

ED S. SMITH, JR.